Patented Aug. 22, 1944

2,356,622

UNITED STATES PATENT OFFICE 2,356,622

MANUFACTURE OF CYCLIC AMIDINES

Paul Schlack, Berlin-Treptow, Germany; vested in the Alien Property Custodian

No Drawing. Application May 18, 1940, Serial No. 336,001. In Germany February 9, 1939

4 Claims. (Cl. 260—2)

This invention relates to the manufacture of cyclic amidines and artificial materials produced thereof.

It is an object of the present invention to produce reactive polyfunctional amidine compounds.

A further object is the production of polyfunctional amidine compounds which may be transformed directly into synthetic materials.

These and other objects will be apparent from the following description.

It has been found, that polyfunctional amidine compounds of wide use, which are suitable for the synthesis of artificial materials and which may be worked up under certain conditions directly into such artificial material, are obtained, if O-substituted enol compounds of lactams are caused to react with polyfunctional compounds containing more than one amino group or at least one amino group and at least one hydroxyl or sulfhydryl group of aliphatic character or at least one carboxyl group or a transformed carboxyl group, e. g., a nitrile group, ester group or amide group, whereby, if necessary, either the lactam derivatives or the counter components containing amino groups may be present in the form of salts. If a polyvalent amino compound functioning as counter component is saturated with a polyvalent carboxylic acid, primary reaction products are obtained, which, if further heated at a correspondingly high temperature of for instance 170-270° C., turn into high molecular polyamides.

The primary reactions with the lactam derivatives were found to run off as a rule very smoothly, though side reactions on account of ring cleavage have to be taken into consideration at least with lactams having more than six ring members. For this process there may be employed in principle oxygen derivatives, for instance O-alkyl ether or O-ester of all lactams. For the synthesis of polyamide artificial materials, however, especially those products are valuable which are derived from lactams with at least seven atoms in the ring. As starting material there may be mentioned the following: the O-methylethers from γ-butyrolactam, the O-methylethers from δ-valerolactam, the O-methylethers from ε-caprolactam, the O-methylethers of the C-methyl-ε-caprolactams and the O-methylethers of the lactam of the ζ-amino heptylic acid (suberone isoxime), further the O-n-butylether and the O-phenylether and the benzenesulfoester of the enolic ε-caprolactam.

The O-alkylethers are obtained in the usual manner by the reaction of the lactimsulfoester with alcohols or alkoholates, furthermore, as it was found, by the reaction of the lactams with dialkylsulfates or arylsulfo acid esters, preferably in the presence of indifferent solvents like benzene or xylene. Also the alkylsulfonic acid esters, as further was found, are reactive and may be used for the reactions either as such or transformed into the distillable lactim ethers. The alkylsulfonic acid esters are obtainable, if alkyl sulfo chlorides, for instance propane sulfo chloride or propane disulfo chloride are caused to react with lactams in the presence of tertiary amines, for instance pyridine.

For the transformation of the lactam derivatives (lactim compounds) into amidines for instance the following polyfunctional amino compounds or, if the free lactimethers are used also their salts, for instance with hydrochloric acid, toluene sulfonic acid, adipic acid, sebacic acid may be employed: Ethylenediamine, diethylenetriamine, polyethyleneimine, putrescin, hexamethylenediamine, symm. dimethylhexamethylenediamine, octamethylenediamine, ββ′-diaminodiethylether.

Other suitable amino compounds are: 3.3′-diaminodipropylsulfide, 3-aminopropandiol-1, 5-aminopentanol-1, 5-aminoamylmercaptan-1, 6-aminohexane acid (sodium salt), 6-aminohexane acid nitrile, 6-aminohexane acid methylester.

The change into amidine compounds may be accomplished already by using the primary reaction products produced for instance by the unification of lactam and dimethylsulfate, if the formation of the lactim compounds is brought about sufficient smoothly. This simplifies the procedure very much. Usually the reaction is carried out in aqueous, alcoholic or alcoholic-aqueous solution. In some cases, especially with very unstable cyclic compounds, the use of water- and hydroxyl-free solvents is preferred, e. g., tetrahydrofuran, dioxane, glycol formal, methylenechloride and benzene. Needless to say also the solubility of the reaction mixture and the capability of being isolated is important for the selection of the solvent. By the reaction of the free lactim ethers with amines, if necessary in the presence of a small portion of catalytically effective hydrogen halide, the amidines are obtained immediately in the form of the free bases. If one starts from lactim ether salts, the corresponding amidine salts are obtained. The same applies to the possible reaction of free lactim ethers with amine salts and the reaction of amine bases with sulfoesters of the enolic lactams. When working with delicate salts it is of advantage to use water- and hydroxyl-free solvents so that ring cleavage is avoided. In this connection it is important to note that the addition compounds of diethylsulfates and arylsulfonic acid esters with many lactams are soluble in hydrocarbons containing chlorine and in benzene. From these solutions the free ethers may be obtained by discharging them into potassium carbonate solution and purifying them by distillation. Also by a double-reaction with salts of other acids, e. g., of dicarboxylic acids, valuable intermediate products adapted for artificial materials may be precipitated.

The products according to this invention are most useful as such or in the form of their reaction products as auxiliary agents in the textile industry and related branches of the chemical technology. They are especially adapted as intermediate products for the production of synthetic resins or artificial materials. Such products were obtained, if the reaction product of the lactim compounds with at least two amino groups or with amino groups and at least one hydroxyl- and sulfhydryl group are heated up with di- or polycarboxylic acids or, if the products, still containing carboxyl groups besides the newly formed amidine groups, are condensed with themselves in the heat or finally, if products showing still transformed carboxyl groups besides the amidine groups, e. g. nitrile groups and carboxyl acid ester groups are heated up at higher temperatures, for instance 150–300° C., in the presence of water or compounds capable of splitting off water, for instance condensable amino acids or salts of diamines and dicarboxylic acids.

Instead of the free amidine compounds also salts of these compounds with volatile acids like carbonates and especially formates, also products with methylated amino groups may be used. If nitrile compounds are used, one works according to my U. S. patent application Serial No. 308,093, filed December 7, 1939; for formyl compounds see my U. S. patent application Serial No. 307,984, filed December 7, 1939, now Patent No. 2,277,152.

If bifunctional compounds according to this invention are condensed with dicarboxylic acids or derivatives of such acids, if necessary in the presence of water, alcohol or compounds capable of splitting off water, especially also of products forming condensation polymers by dehydration, like ω-amino acids, ω-oxy acids or of mixtures of about equivalent portions of αω-diamines or αω-dicarboxylic acids and if necessary of reaction accelerating or regulating modifying agents, for instance mineral acids or compounds splitting off such acids, like hydrochloric acids, toluene sulfo acid, benzylchloride or of salts of bases with strong acids like ammonium chloride, hydrochlorides of amines or amino acids, linear fusible high-polymers are obtained, which may be worked into filaments, foils or three-dimensional structures, for instance diecasting compositions, provided the chain is sufficiently long. Modifying agents, for instance hydrogen halides, may be contained in definite proportions in the intermediate products, for instance if the reaction of the lactim ethers with free diamines or with salts of diamines and dicarboxylic acids is carried out in the presence of small proportions of hydrogen chloride, for instance $1/400$–$1/25$ mol for two mol lactim, and if then the condensation is continued without purification, in the first case by adding a nearly equivalent portion of dicarboxylic acid calculated by titration. The condensations may take place at ordinary, increased or reduced pressure. It is often useful to carry out the first step under pressure, whereby the reaction may be considerably accelerated. The increase in pressure may be accomplished by adding indifferent liquids of low vapor-pressure, by adding water or alcohol, by alcohol formed during the reaction or by forcing in an indifferent gas, for instance nitrogen.

If products containing more than two functional groups are used, three-dimensional more or less insoluble and infusible structures are obtained. Such products may be formed in the way of phenolplasts (condensation products of phenols and formaldehyde) or aminoplasts (condensation products of urea and/or thiourea with formaldehyde) by working them in a low polymeric state and by a subsequent hardening process, if necessary mixed with filling materials. In most cases it is preferable to work the products with more than two functional groups together with bifunctional ones in portions only, whereby the physical properties of the final products may be modified within wide limits. These compounds for instance may be condensed together with aldehydes and resin-forming amides like urea, thiourea, dicyandiamide and heterocyclic polyvalent amino compounds, for instance di- and triamino triazines. Polyfunctional amidines with at least two exchangeable hydrogen-on-nitrogen atoms may be condensed or pressed into resins directly with compounds splitting off aldehyde like formaldehyde, p-formaldehyde, hexamethylenetetramine and the like.

*Example I*

ε-caprolactam is transformed in benzene solution (3 volume parts benzene to 1 volume part lactam) by boiling for 6 hours with the equivalent amount of dimethylsulfate into the methylsulfuric acid salt of the lactim methyl ether, which is slightly soluble in benzene. The benzene solution, which does not contain a precipitate, is discharged into a 50 per cent potassium carbonate solution, which is in excess and covered with a layer of ether, thus liberating the lactim ether. It is obtained by fractional distillation of the dried benzene-ether layer in good output as colorless, terpene-like smelling liquid (B. P.$_4$ 50–52° C.).

Two mols lactim ether are dissolved in the same volume of alcohol and mixed with one mol hexamethylenediamine. After standing over night it is heated some more hours on the water bath and then the alcohol is distilled off. The remaining product is condensed with the equivalent amount of sebacic acid or adipic acid into a hard artificial material which may be spun from the melt.

The condensation proceeds very smoothly at temperatures between 220 and 260° C., as disturbing, volatile ingredients are practically not formed.

Instead of the free amidines the dihydrochloride is obtained, if the hexamethylenediamine is replaced by its dihydrochloride. The hydrochloride, very easily soluble in chloroform and alcohol, is precipitated by dried ether in the form of colorless crystals.

Similar divalent amidines as with hexamethylenediamine are obtained, if the lactim ether is caused to react with the calculated amounts of ethylene diamine, putrescine or symmetrical dimethylhexamethylenediamine.

Example II

From the lactim ether of the ε-caprolactam obtained according to Example I a product is obtained directly condensable into polyamide by heating at 200–260° C., if two mols lactim ether are mixed with one mol hexamethylenediamine-adipic acid salt in hot alcoholic solution, the mixture then heated for several hours at 100° C., the alcohol then distilled off and the condensation is carried through at 220–260° C. Finally also two mols of the lactim ether and one mol salt may be gradually heated at 200–220° C. in a silver plated autoclave without a solvent, the pressure be relieved and the condensation be finished at 220–250° C.

Example III

The lactim methyl ether from ε-amino caprolactam is heated with one mol 5-aminohexanol-1 and the reaction product heated with the equivalent amount β-methyl adipic acid at 150–250° C. in a nitrogen atmosphere first for 6 hours under atmospheric pressure, then for 6 hours in a high vacuum (about 1 mm.). A relatively soft product which may be drawn into filaments is obtained.

Example IV

The 5-aminohexanol of Example III is substituted by the equivalent amount of 5-aminoamylmercaptan. The mercaptoamidine is condensed into a resin with formaldehyde in the presence of formic acid or oxalic acid.

Example V

The lactim methyl ether from ε-caprolactam is left overnight with the equimolecular amount 6-aminohexane acid nitrile in alcoholic solution by adding 1/100 mol hydrochloric acid to 1 mol lactim ether and then (after 16 hours) heated on a steam bath for still a certain while. The reaction product remaining after the distillation is condensed by heating at 225–230° C. in the presence of water in a sealed vessel into an artificial material, which may be spun from the melt after the pressure is relieved and the mass further heated for several hours at 250° C. The substance melts at about 208° C.

Example VI

The lactim methyl ether from 4-methylcyclohexanone-isoxime (mixture of 2 stereoisomers) is condensed with the equimolecular amount diethylene triamine. The reaction product gives a basic synthetic resin when heated with aqueous formaldehyde in the presence of acetic acid, which is used as auxiliary agent for dyestuff purposes.

Example VII

The benzene sulfo ester of the enolic ε-caprolactam is stirred while cooling into an alcoholic solution containing an excess of hexamethylenediamine. The reaction product presents a mixture, partly neutralized by benzene sulfo acid, consisting of the symmetrical hexamethylenediamidine, hexamethylenediamine and a compound obtained by reaction of 1 mol hexamethylenediamine and 1 mol lactim ester. The mixture may be directly used for the production of artificial materials by condensing with a dicarboxylic acid approximately corresponding to the amount of basic substances. The excess of hexamethylene diamine may be removed from the mixture of the free bases by distillation. The benzene sulfo ester is obtained by a reaction of the lactam with the sulfo chloride while sufficiently cooling in the presence of a tertiary base like pyridine.

Example VIII 1 mol piperidon is transformed in the presence of pyridine with propane sulfo chloride into the lactim sulfo ester. By the reaction of the ester with a solution of sodium butylate in n-butanol there is obtained the lactim butyl ether which is distillable without decomposition in the vacuum. By heating of the lactim ether with half the equivalent of water-free ethylenediamine at 140° C. a reaction product by cleavage of butanol is obtained being condensable with formaldehyde into an artificial product capable of absorbing dyestuffs.

Similar products are obtained, if instead of the lactim ether from piperidon the α-thiopiperidon or its S-alkylethers are caused to react with the diamines.

I claim:

1. Process for the production of reactive polyfunctional amidine compounds which comprises heating an O-substituted enol compound of a lactam selected from the class consisting of O-alkyl ethers and O-alkylsulfo- and benzenesulfo esters with an aliphatic polyfunctional compound selected from the class consisting of those having as one functional group an amino group and as the only other functional group a group selected from the class consisting of amino, hydroxyl, mercapto, carboxy, and nitrile radicals.

2. The process as defined in claim 1, wherein the reaction is effected in the presence of a volatile hydroxyl-containing solvent selected from the class consisting of water and alcohols.

3. Process according to claim 1 in which the polyfunctional compounds are di-primary diamines.

4. Process according to claim 1 in which the polyfunctional compounds are salts consisting of α,ω-diamines and α,ω-dicarboxylic acids.

PAUL SCHLACK.